United States Patent [19]

Leibhard

[11] Patent Number: 4,907,917
[45] Date of Patent: Mar. 13, 1990

[54] METHOD OF SECURING ANCHOR RODS

[75] Inventor: Erich Leibhard, Munich, Fed. Rep. of Germany

[73] Assignee: Hilti Aktiengesellschaft

[21] Appl. No.: 260,232

[22] Filed: Oct. 20, 1988

[30] Foreign Application Priority Data

Oct. 21, 1987 [DE] Fed. Rep. of Germany ....... 3735592

[51] Int. Cl.⁴ .................. E02D 5/80; E02D 27/50; E21D 20/02
[52] U.S. Cl. ................................. 405/261; 405/225; 405/260
[58] Field of Search ............... 405/260, 261, 262, 224, 405/225; 206/219, 220

[56] References Cited

U.S. PATENT DOCUMENTS 4,372,708  2/1983  Bower et al. ................. 405/261
4,395,162  7/1983  Murphy et al. ............... 405/261

Primary Examiner—David H. Corbin
Attorney, Agent, or Firm—Toren, McGeady & Associates

[57] ABSTRACT

A method of securing an anchor rod in a borehole at an underwater location without the use of expanding force includes a first step of partially filling the borehole with a flowable hardenable bonding mass. Next, a cartridge containing a hardenable bonding mass is placed in the borehole and a part of the flowable bonding mass is displaced from the borehole. Since the cartridge substantially fills the borehole, the flowable bonding mass flows between the borehole surface and the cartridge. Finally, an anchor rod is driven into the borehole breaking up or destroying the cartridge, so that the two bonding masses mix, harden and bond the anchor within the borehole.

10 Claims, 1 Drawing Sheet

U.S. Patent  Mar. 13, 1990  4,907,917
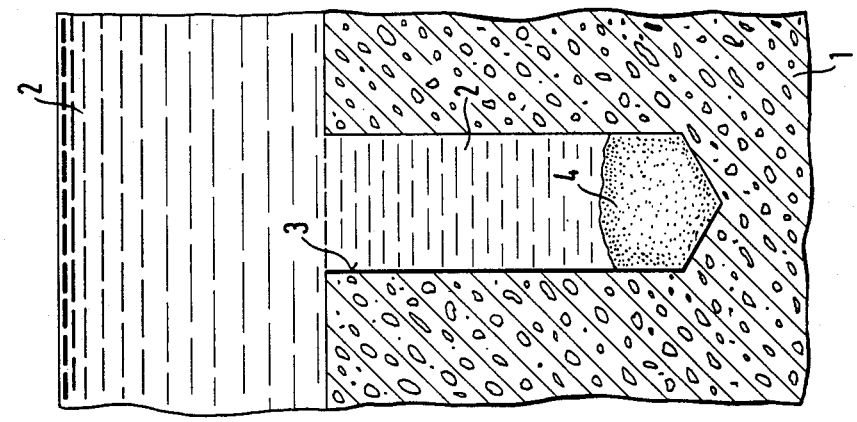
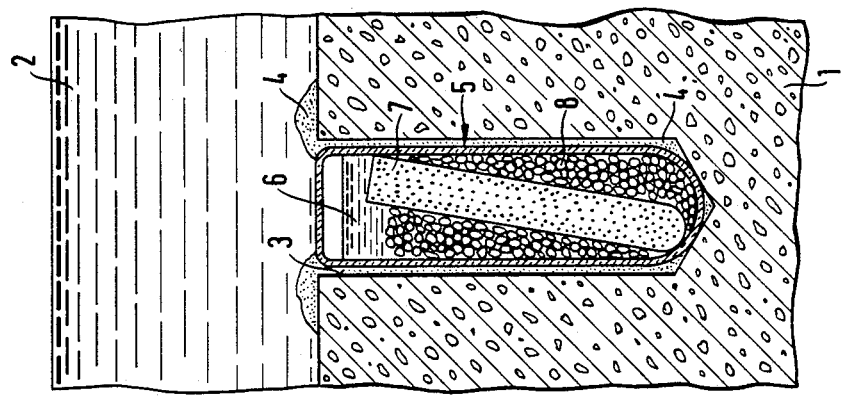
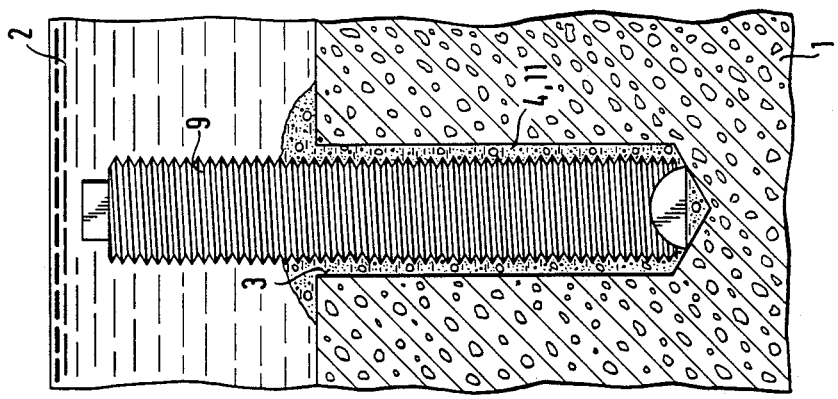

METHOD OF SECURING ANCHOR RODS

BACKGROUND OF THE INVENTION

The present invention is directed to a method of securing an anchor rod in a borehole, where the borehole is at least partially filled with a liquid, by means of a hardenable single or multi-component bonding mass.

In underwater construction, such as for attachments to foundations, piers, slabs and the like, increasingly fasteners free of any expanding action are used in place of fasteners secured in the manner of mechanically expanded anchors. To produce such fasteners, free of any expanding action, cement mortar and single or multi-component bonding masses have been known. These known types of anchorages, cannot used in underwater construction without difficulties.

Cement mortar has the disadvantage that it is diluted when used under water and, as a result, loses its effectiveness. Similarly, bonding masses have the disadvantage that water forms an emulsion with the mass, whereby the bonding mass is unable to provide the required adhesive properties. In each case, inadequate anchoring values result using these known procedures in underwater construction.

SUMMARY OF THE INVENTION

Therefore, the primary object of the present invention is to provide an effective method for fastening or securing anchor rods, without the use of expanding force, in boreholes filled with a liquid, particularly in underwater construction, permitting high and reliable anchoring values.

In accordance with the present invention, initially a borehole is partially filled with a flowable hardenable bonding mass, next a cartridge containing a hardenable bonding mass is introduced into the borehole, finally the cartridge is broken or destroyed as an anchor rod is driven into the borehole and the bonding masses mix and harden.

The flowable bonding mass is introduced into the borehole in a first method step using a pressing or squeezing dispenser. The dispenser may be provided with an elongated nozzle or stub for dispensing the mass into the borehole. Since the bonding mass has a higher density that the liquid, such as water, the flowable bonding mass settles to the bottom of the borehole, such as in boreholes extending vertically downward. Further, the adhesive properties of this bonding mass assist it in remaining in place after it has been introduced into the borehole.

When the cartridge containing another bonding mass is inserted into the borehole, the flowable bonding mass is displaced outwardly from the bottom of the borehole through an annular gap between the cartridge and the surface of the borehole, with a portion of the flowable bonding mass flowing out of the borehole opening. In this displacement operation, the water within the borehole is also displaced leaving the borehole virtually free of water. As a result, before the anchor rod is inserted, the borehole is completely filled by a plug free of water and made up of the cartridge and the flowable bonding mass. In the final step of the method, the anchor rod is driven into the plug, breaking up or destroying the cartridge, and the flowable mass together with the cartridge particles form an adequate seal for the anchor rod during the entire driving procedure, whereby water cannot penetrate into the bonding mass exposed by the destruction of the cartridge.

Preferably, the borehole is filled with a quantity of the flowable first bonding mass amounting to about 0.1 to 0.3 times the borehole volume. Such a quantity of the flowable bonding mass assures that the annular gap between the cartridge and the borehole surface is at least adequately filled and, as a result, a complete displacement of the liquid is effected from the borehole. This procedure is further improved, if the cartridge has a volume corresponding essentially to that of the borehole. With the axial length and the cross-section of the cartridge corresponding approximately to the axial length and cross-section of the borehole, only limited free spaces remain between the cartridge and the surface of the borehole.

It is preferable in carrying out the method to use a two-component bonding mass as the flowable bonding mass introduced into the borehole and as the bonding mass within the cartridge. Wen using such a two-component bonding mass as a flowable bonding mass, it is advantageous to effect pre-mixing prior to the introduction of the mass into the borehole and this can be effected by means of a conventional pressing or squeezing dispenser. Such a dispenser can be slightly modified for use under water, in accordance with the present method, by using an elongated dispensing nozzle. The individual components of the bonding mass are arranged in the cartridge within separate compartments, possibly mixed with fillers.

Preferably, epoxy acrylate compounds are used as the two-component bonding mass forming the flowable bonding mass and the bonding mass contained in the cartridge. Apart from epoxy acrylate, used because of its advantageous liquid resistant properties, principally styrol has also been utilized as an additional bonding mass.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described embodiments of the invention.

DESCRIPTION OF THE DRAWINGS

In the drawings:

FIG. 1 is a sectional view showing a borehole located under water and partially filled with a flowable bonding mass;

FIG. 2 is a sectional view, similar to FIG. 1, with a cartridge containing the bonding mass inserted into the borehole; and FIG. 3 is a view similar to FIGS. 1 and 2, illustrating an anchor rod driven into the cartridge shown in FIG. 2.

DETAILED DESCRIPTION OF THE INVENTION

In the drawing, a concrete wall is shown in section and is located under water 2, note the level of the water is located above the concrete wall. A borehole 3 is formed in the concrete wall 1 and is also filled with water 2. A flowable two-component bonding mass 4 has been introduced into the borehole and has settled to the bottom of the borehole. Bonding mass 4 fills the borehole for approximately one-quarter of its volume, as a result, the remaining volume of the borehole is filled with water 2.

After the flowable bonding mass 4 has been dispensed into the borehole 3, a cartridge 5, such as a glass ampule, is inserted into the borehole, as illustrated in FIG. 2. The volume of the cartridge 5 corresponds approximately to the volume of the borehole 3 so that when the cartridge 5 is inserted into the borehole 3, the water 2 is displaced from the borehole. The bonding mass 4, located in the bottom of the borehole 3 when the cartridge 5 is inserted, is displaced toward the opening to the borehole through a gap located between the cartridge and the borehole surface. As a portion of the bonding mass 4 flows out of the borehole 3, any residual water 2, located in the gap or space between the cartridge and the borehole surface is forced out of the borehole.

A two-component bonding mass is also located within the closed cartridge 5 and the bonding mass components within the cartridge are separated from one another. As shown, the cartridge 5 contains a hardenable epoxy acrylate resin 6, a filler 8, and a breakable or destructible ampule, containing a second resin component 7, located within the cartridge.

As shown in FIG. 3, an anchor rod 9 is driven into the borehole 3, and, at the same time, it is rotated. As a result of the driving and rotational movements of the anchor rod, the cartridge is broken and its contents are intermixed with the broken parts of the cartridge forming a hardenable bonding mass 11 which intermixes with the flowable bonding mass 4 introduced previously into the borehole.

While specific embodiments of the invention have been shown and described in detail to illustrate the application of the inventive principles, it will be understood that the invention may be embodied otherwise without departing from such principles.

I claim:

1. A method of fastening an anchor rod in a borehole containing water by means of a hardenable bonding mass, comprising the steps of partially filling the borehole with a flowable bonding mass, inserting a closed cartridge containing a bonding mass into the borehole with the flowable bonding mass located outside the cartridge and at least partially displacing the flowable bonding mass within the borehole, and driving an anchor rod into the borehole for destroying the cartridge and mixing the flowable bonding mass and the bonding mass in the cartridge for anchoring the anchor rod in the borehole.

2. A method, as set forth in claim 1, including the step of displacing all of the water from the borehole when carrying out the steps of filling the borehole with the flowable bonding mass and inserting the cartridge.

3. A method, as set forth in claim 2, including displacing at least a portion of the flowable bonding mass from the borehole when inserting the cartridge for displacing the water from the borehole.

4. A method, as set forth in claim 1, wherein filling the borehole with an amount of the flowable bonding mass corresponding approximately to 0.1 to 0.3 times the volume of the borehole.

5. A method, as set forth in claim 1, wherein using a cartridge having a volume corresponding approximately to the volume of the borehole.

6. A method, as set forth in claim 1, wherein each of the flowable bonding mass and the bonding mass in the cartridge is a two-component bonding mass.

7. A method, as set forth in claim 6, wherein each of the two-component bonding masses comprises an epoxy acrylate compound.

8. A method, as set forth in claim 6, wherein the two-component bonding mass is flowable.

9. A method, as set forth in claim 6, wherein the two-component mass is arranged within the cartridge along with fillers.

10. A method, as set forth in claim 9, wherein the two-component bonding mass within the cartridge comprises a first component located within a closed ampule within the cartridge and a second component within the cartridge and located exteriorly of and separate from the ampule.

* * * * *